(12) United States Patent
Borja et al.

(10) Patent No.: US 7,322,195 B2
(45) Date of Patent: Jan. 29, 2008

(54) ACOUSTIC DAMPERS

(75) Inventors: Mark Edward Borja, Palm Beach Gardens, FL (US); Gavin Julian Hendricks, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 378 days.

(21) Appl. No.: 11/109,930

(22) Filed: Apr. 19, 2005

(65) Prior Publication Data

US 2006/0231329 A1   Oct. 19, 2006

(51) Int. Cl.
*F02C 7/24* (2006.01)

(52) U.S. Cl. .................. 60/725; 181/213; 415/119; 431/114

(58) Field of Classification Search ............... 60/725; 181/213, 214; 415/119; 431/114
See application file for complete search history.

(56) References Cited

U.S. PATENT DOCUMENTS 3,483,698 A * 12/1969 Lewis et al. .................. 60/725
5,702,231 A * 12/1997 Dougherty .................. 415/119

FOREIGN PATENT DOCUMENTS

JP          05-215027          8/1993

* cited by examiner

*Primary Examiner*—L. J. Casaregola
(74) *Attorney, Agent, or Firm*—Bachman & LaPointe

(57) ABSTRACT

An acoustic resonator for use in an engine is provided. The acoustic resonator includes a cavity having a volume, an aperture, and a passage connecting the aperture and the cavity. The aperture has a profiled surface for delaying separation of fluid entering the passage and for reducing losses caused by fluid separation.

8 Claims, 5 Drawing Sheets

ACOUSTIC DAMPERS

STATEMENT OF GOVERNMENT INTEREST

The Government of the United States of America may have rights in the present invention as a result of Contract No. F33657-98-C-2004 awarded by the Department of the Air Force.

BACKGROUND OF THE INVENTION (1) Field of the Invention

The present invention relates to an improved acoustic damper used in aircraft engine applications.

(2) Prior Art

A Hemholtz resonator 10, such as shown in FIG. 1, is a device commonly used to dissipate acoustic energy. The resonator 10 typically consists of an aperture 12, an enclosed volume or cavity 14, and a passage or tube 16 connecting the aperture 12 to the volume 14.

Resonators are used in the augmentor section of a gas turbine engine to suppress a thermo-acoustic instability known as screech. If not suppressed, screech has the potential of causing structural damage in the augmentor section. Hemholtz resonators are also used in rocket engines for thermo-acoustic instability suppression and in aircraft nacelle inlets and fan ducts for noise suppression. Maximum acoustic dissipation occurs at the resonant frequency of the Hemholtz resonator, which is determined by the geometric parameters of the resonator, i.e. aperture area, passage length, and cavity volume. The resonant frequency of a resonator can be adjusted by varying its geometric parameters. The performance of the resonator, i.e. the degree of acoustic suppression it provides, is determined by both the geometric parameters of the resonator and the flow resistance (or total pressure loss) that the working fluid encounters when it enters the volume through the aperture.

In an application where the fluid external to the resonator has no mean flow grazing the aperture, the major loss components are the frictional loss in the aperture, and the dump loss encountered by the fluid as it enters the volume. In an application where the external fluid has a mean flow grazing the aperture 12, as shown in FIG. 2, the flow resistance through the aperture 12 increases significantly, compromising the performance of the resonator. The performance of the resonator degrades as the grazing flow Mach number increases. The reason for degradation in resonance performance with grazing flow Mach number is that the flow 18 separates from the leading edge 19 of the aperture, as illustrated in FIG. 2, increasing the flow resistance. The amount of air entering the resonator 10 is limited by the size of the recirculation zone 17. The recirculation zone 17 reduces the size of the available aperture cross section through which fluid can flow in to the resonator 10.

SUMMARY OF THE INVENTION

Accordingly, it is an object of the present invention to provide a resonator which has an improved performance.

The foregoing object is attained by the resonator of the present invention.

In accordance with the present invention, a resonator for use in an engine is provided. The resonator broadly comprises a cavity having a volume, an aperture, and a passage connecting the aperture and the cavity. The aperture has means for delaying separation of fluid entering said passage and for reducing losses caused by fluid separation. In a preferred embodiment, the fluid separation delaying and the loss reducing means comprises a rounded inlet on said aperture.

Other details of the acoustic damper of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
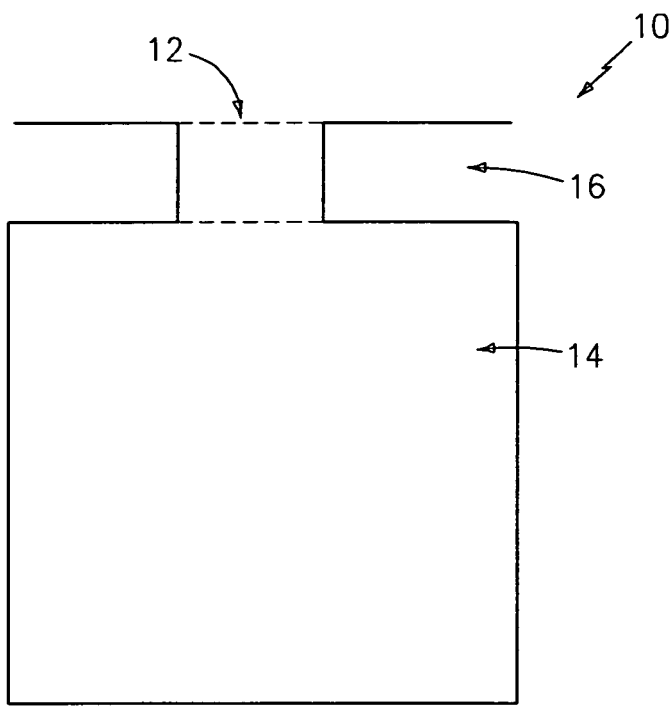
FIG. 1 illustrates a prior art Hemholtz resonator.
Figure 2:
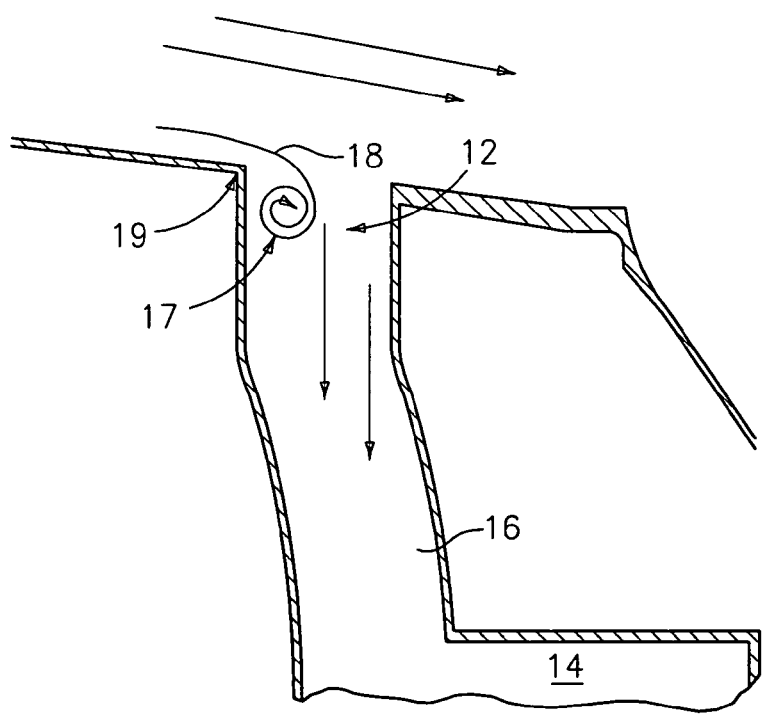
FIG. 2 illustrates the effect of grazing flow in a prior art Hemholtz resonator.
Figure 3:
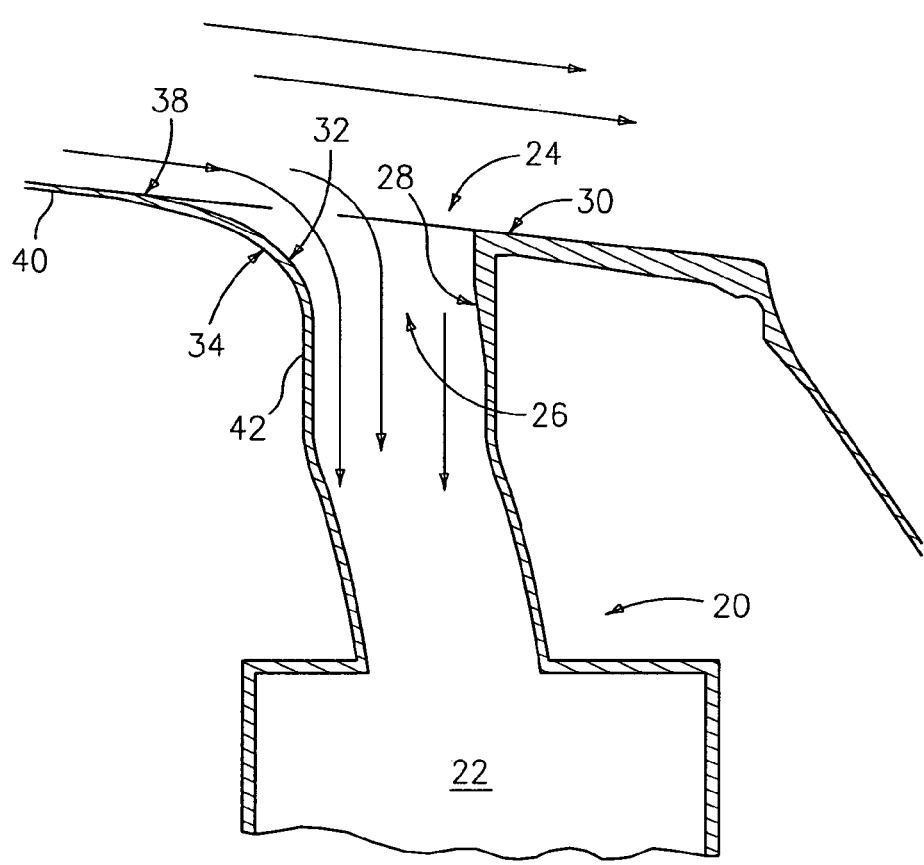
FIG. 3 illustrates a resonator having an aperture in accordance with the present invention.

Referring to the drawings, FIG. 3 illustrates a resonator 20 in accordance with the present invention. The resonator 20 has a cavity 22 which forms a volume, an aperture 24, and a passage 26 connecting the aperture 24 and the cavity 22. The passage 26 has a rear wall 28 which preferably forms a right angle with a rear surface 30. The passageway walls 28 and 29 may be linear or may have a curvature to them.

In order to delay separation of the fluid entering the passage 26, the leading edge 32 of the aperture 24 has a profiled or curved inlet portion 34. By providing the profiled or curved inlet portion 34, the size of the recirculation zone that is formed is reduced and limited. As a result, more fluid can enter the resonator 20 through the aperture 24 and the passage 26, thus improving the ability of the resonator 20 to damp acoustic energy.

As can be seen from FIG. 3, the curved inlet portion 34 extends from a point 38 on a surface 40 to a point 42 about midway in the passage 26. The point 38 should be far enough back on the surface 40 that the flow does not separate from the upstream wall 32.

Figure 4:
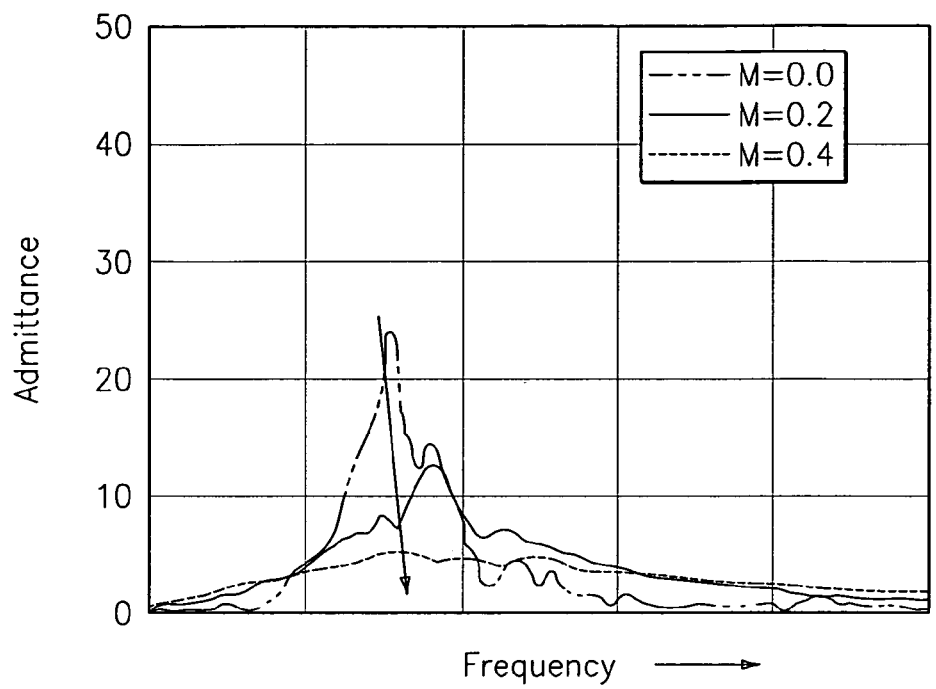
FIG. 4 illustrates baseline resonator performance.
Figure 5:
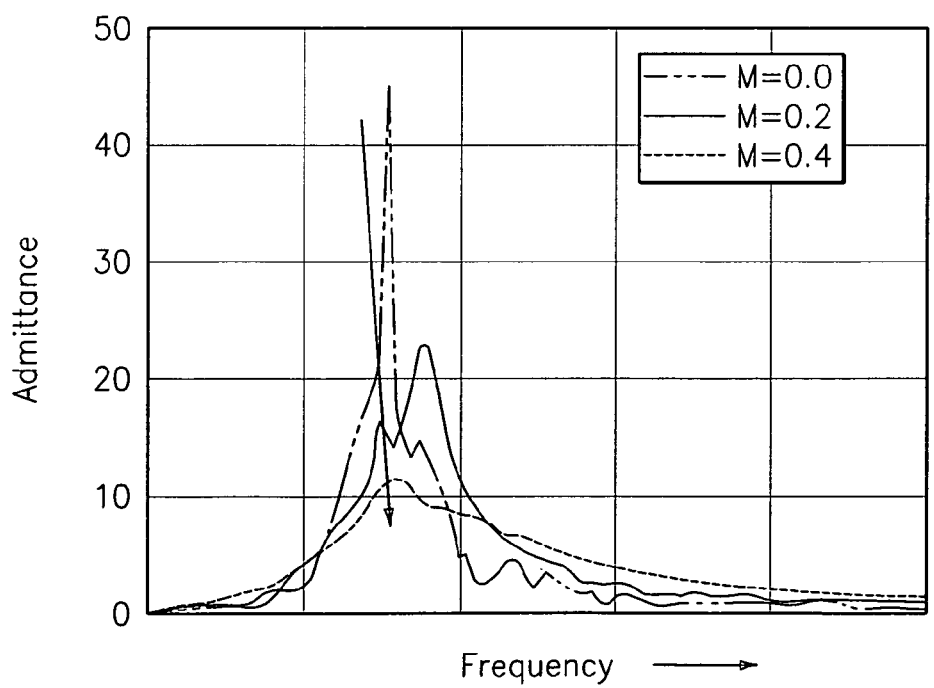
FIG. 5 illustrates the performance of a resonator having a profiled aperture in accordance with the present invention.

It has been found that by using the profiled or curved inlet portion 34, the performance of the resonator may be doubled. This is demonstrated by the resonator performance shown in FIG. 5 as compared to the baseline resonator performance shown in FIG. 4.

Figure 6:
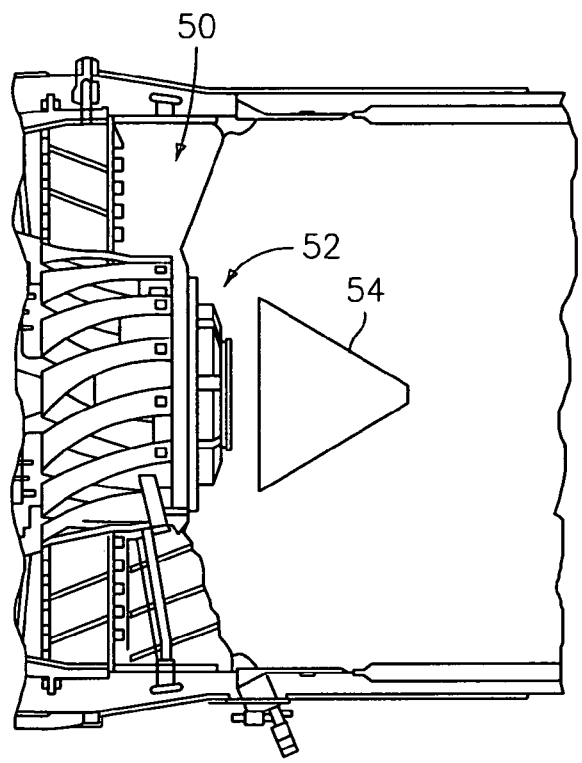
FIG. 6 illustrates a portion of an augmentor section of an engine in which the resonator of the present invention may be used.
Figure 7:
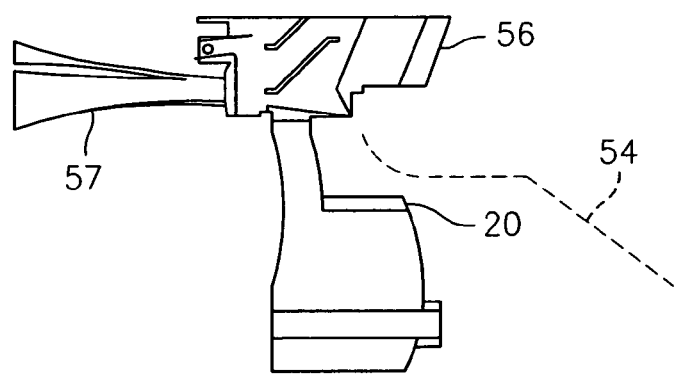
FIG. 7 is an enlarged view of the resonator in the augmentor section of the engine.

Referring now to FIGS. 6 and 7, there is shown an augmentor section 50 of an engine 52. The engine 52 may comprise any suitable gas turbine engine known in the art. The resonator 20 may be placed within a tail cone structure 54 beneath the turbine exhaust case box 56 to which are connected inner diameter panels 57.

The resonator design of the present invention is quite advantageous. Improving the performance leads to substantial weight and cost savings because a reduced number of resonators are needed with little cost increase to the detail design.

Figure 9:
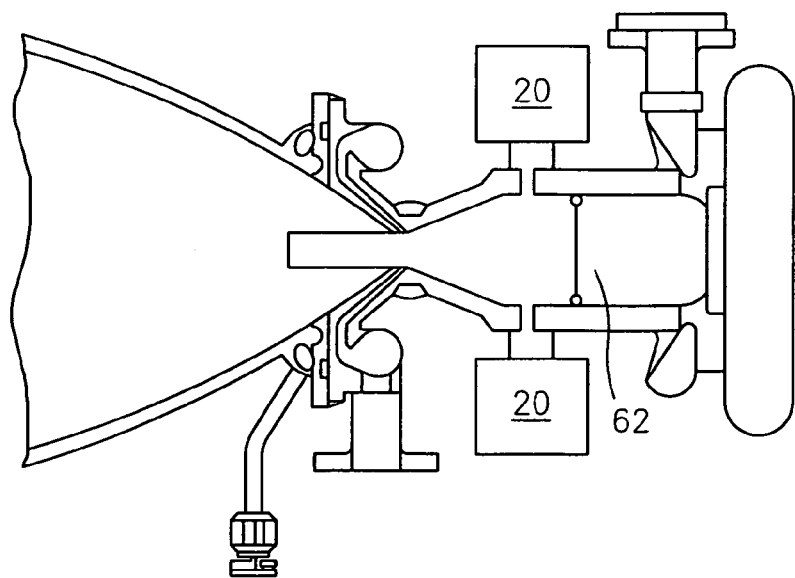
FIG. 9 is a schematic representation of a resonator in accordance with the present invention as used with a rocket engine.
Figure 8:
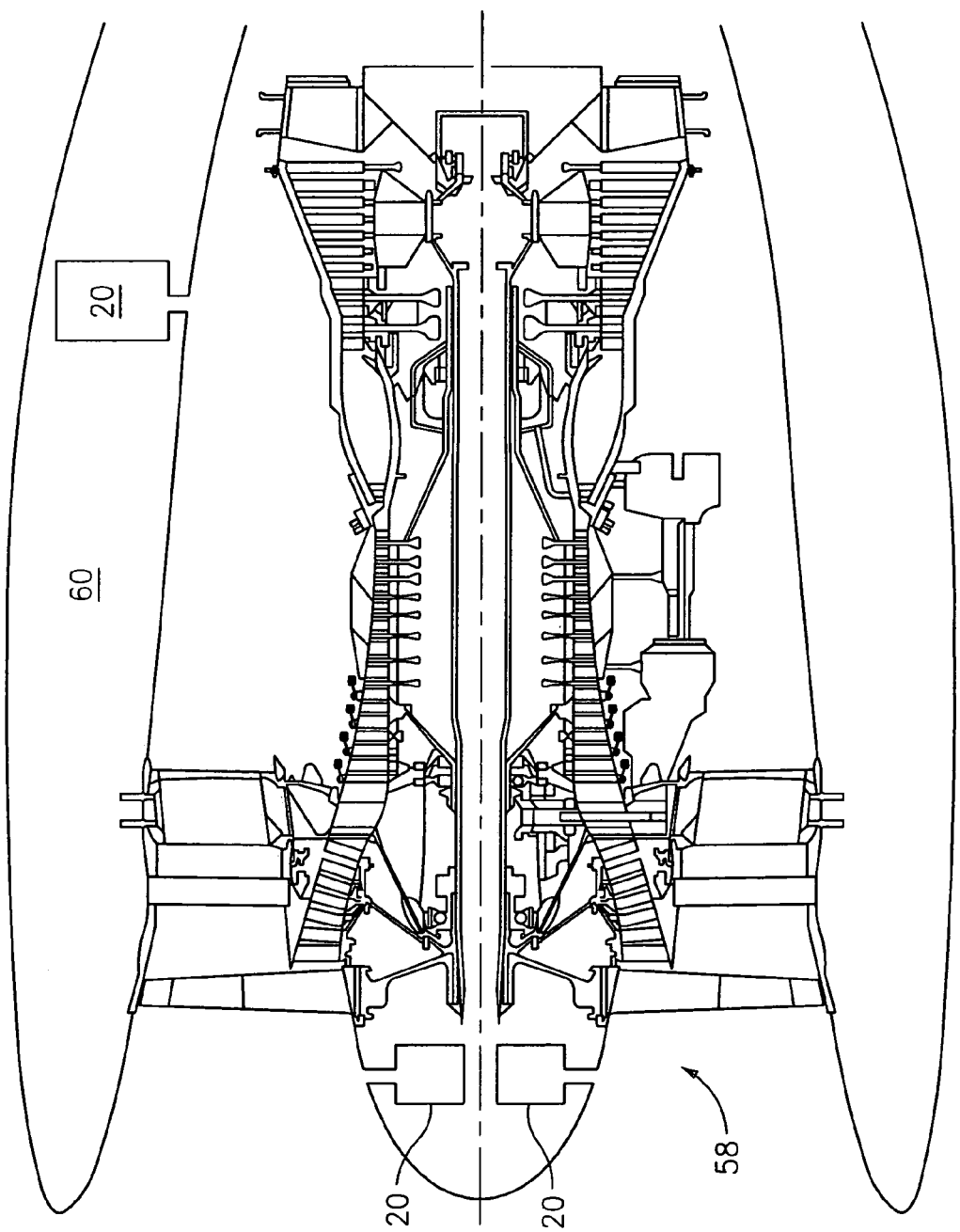
FIG. 8 is a schematic representation of a resonator in accordance with the present invention provided in an engine fan inlet and a nacelle inlet.

The design of the resonator 20 of the present invention may be used in any moving flow field. For example, as shown in FIG. 8, one or more resonator(s) 20 may be incorporated into a fan inlet 58 of an engine. One or more resonator(s) 20, as shown in FIG. 8, may be incorporated into a nacelle inlet 60 in addition to, or in lieu of, the resonator(s) in the fan inlet. Still further, as shown in FIG. 9, one or more resonator(s) 20 may be incorporated into a rocket exhaust nozzle 62.

It is apparent that there has been provided in accordance with the present invention an acoustic damper which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A resonator comprising:
 a cavity having a volume, an aperture, and a passage connecting the aperture and the cavity;
 said aperture having means for delaying separation of fluid entering said passage and for reducing losses caused by fluid separation;
 said aperture having a leading edge and said separation delaying means comprising said leading edge being formed by a non-planar surface; and
 said aperture having a trailing edge and said trailing edge being formed by a first planar surface intersecting a second planar surface.

2. The resonator according to claim 1, wherein said non-planar surface is formed by a rounded edge.

3. The resonator according to claim 2, wherein said rounded edge begins at a point far enough back that flow will not separate from said surface.

4. An engine comprising a resonator incorporated into a portion thereof, said resonator comprising a cavity having a volume, an aperture, and a passage connecting the aperture and the cavity; said aperture having means for delaying separation of fluid entering said passage and for reducing losses caused by fluid separation; said aperture having a leading edge and said separation delaying means comprising said leading edge being formed by a non-planar surface; and said aperture having a trailing edge and said trailing edge being formed by a first planar surface intersecting a second planar surface.

5. The engine according to claim 4, wherein said non-planar surface is formed by a rounded edge.

6. The engine according to claim 4, wherein said portion comprises a fan inlet.

7. The engine according to claim 4, wherein said portion comprises a nacelle inlet.

8. The engine according to claim 4, wherein said portion comprises a portion of a rocket engine nozzle.

* * * * *